:::page

(12) United States Patent
Johnson et al.

(10) Patent No.: US 8,171,614 B2
(45) Date of Patent: May 8, 2012

(54) SYSTEMS AND METHOD OF ASSEMBLING A TOWER SECTION

(75) Inventors: Stephen Bertram Johnson, Greenville, SC (US); Danian Zheng, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/979,741

(22) Filed: Dec. 28, 2010

(65) Prior Publication Data

US 2011/0283507 A1 Nov. 24, 2011

(51) Int. Cl.
*B23Q 3/00* (2006.01)
*B25B 27/14* (2006.01)
(52) U.S. Cl. .......................... 29/464; 29/281.4
(58) Field of Classification Search .............. 29/464, 29/466, 468, 240, 281.1, 897, 897.3, 897.31, 29/281.4; 52/651.01, 745.17
See application file for complete search history.

(56) References Cited

U.S. PATENT DOCUMENTS

| 6,745,539 | B1 | 6/2004 | Heim |
| 6,979,288 | B2 | 12/2005 | Hazlehurst et al. |
| 2006/0213145 | A1 | 9/2006 | Haller |
| 2010/0083604 | A1 | 4/2010 | Vangsy et al. |
| 2010/0189531 | A1 | 7/2010 | Christensen |
| 2010/0212236 | A1 | 8/2010 | Bourdages |

*Primary Examiner* — John C Hong
(74) *Attorney, Agent, or Firm* — James McGinness, Esq.; Armstrong Teasdale LLP

(57) ABSTRACT

An assembly system for use in assembling a lattice tower section is provided. The system comprises a platform, a first mounting assembly coupled to the platform, and, a second mounting assembly coupled to the platform, the first and second mounting assemblies are configured to secure opposite ends of a plurality of leg members used in assembling the lattice tower section such that each of the plurality of leg members is suspended a distance from the platform, at least one of the first and second mounting assemblies is configured to selectively rotate a leg member of the plurality of leg members suspended therefrom.

18 Claims, 8 Drawing Sheets

SYSTEMS AND METHOD OF ASSEMBLING A TOWER SECTION

BACKGROUND OF THE INVENTION

The subject matter disclosed herein relates generally to towers used to support components, and more specifically, to lattice towers.

Tower structures can be used as bases to support structures, such as wind turbine components, mobile phone tower components, and utility tower components. Such towers are often constructed on site, as the towers themselves may be much larger than is practically transportable.

For wind turbine towers, such towers support wind turbines used to deliver more power to customers. At least some known wind turbine towers, such as tubular towers, are constructed from sheets of steel rolled into "cans". Adjacent cans are subsequently welded together to form a tubular tower. However, as the need for higher tower heights has increased, the need to use stronger and thicker materials in the base of these towers has also increased significantly. Occasionally, the need for materials having an increased strength and/or thickness can be mitigated by constructing the tower structure with a base having an increased diameter. However, due to transportation limitations, there is a maximum practical diameter for the cans used in a tubular tower.

Other known towers that can be assembled in the field, such as lattice towers, offer certain advantages over tubular towers. The dimensions necessary for lattice towers can be optimized without regard to logistics costs, since such towers are assembled in the field. As such, the diameter of the base of a lattice tower can be fabricated to be as large as desired. However, it is generally more expensive to assemble a lattice tower in the field than to assemble a tubular tower in a factory. Moreover, assembling a lattice tower in the field generally takes more time than assembling a tubular tower in a factory. In addition, because of the weight, awkwardness, and unwieldiness of the lattice tower components, assembling a lattice tower in the field may be more difficult and complex than assembling a tubular tower.

BRIEF DESCRIPTION OF THE INVENTION

In one embodiment, an assembly system for use in assembling a lattice tower section is provided. The system comprises a platform, a first mounting assembly coupled to the platform, and, a second mounting assembly coupled to the platform, the first and second mounting assemblies are configured to secure opposite ends of a plurality of leg members used in assembling the lattice tower section such that each of the plurality of leg members is suspended a distance from the platform, at least one of the first and second mounting assemblies is configured to selectively rotate a leg member of the plurality of leg members suspended therefrom.

In another embodiment, a lattice tower field deployment system is provided. The system comprises an assembly system comprising a platform, a first mounting assembly coupled to the platform, and, a second mounting assembly coupled to the platform, the first and second mounting assemblies are configured to secure opposite ends of a plurality of leg members used in assembling a lattice tower section, the first and second mounting assemblies are configured to selectively rotate at least one of the plurality of leg members suspended therebetween. The system further comprises a support system configured to selectively position the plurality of leg members relative to the assembly system.

In yet another embodiment, a method of assembling a lattice tower section is provided. The method comprises providing an assembly system including a platform, a first mounting assembly coupled to the platform, and a second mounting assembly coupled to the platform, coupling a first end of a first leg member to the first mounting assembly and a second end of the first leg member to the second mounting assembly such that the first leg member is suspended a distance from the platform, coupling a first end of a second leg member to the first mounting assembly and a second end of the second leg member to the second mounting assembly such that the second leg member is suspended a distance from the platform, rotating selectively the first and second leg members utilizing the assembly system, and, coupling at least one cross member between the first and second leg members such that the cross member extends from the first leg member to the second leg member.

DETAILED DESCRIPTION OF THE INVENTION

The systems and methods described herein facilitate assembly of a lattice tower section. Specifically, utilizing the systems and methods as described herein allows for the relatively efficient assembly of a lattice tower section in the field. Specifically, the systems and methods described herein aid in manipulating and assembling components of a lattice tower section. Moreover, the systems and methods described herein are capable of assembling lattice tower sections of various diameters and heights.

Figure 1:
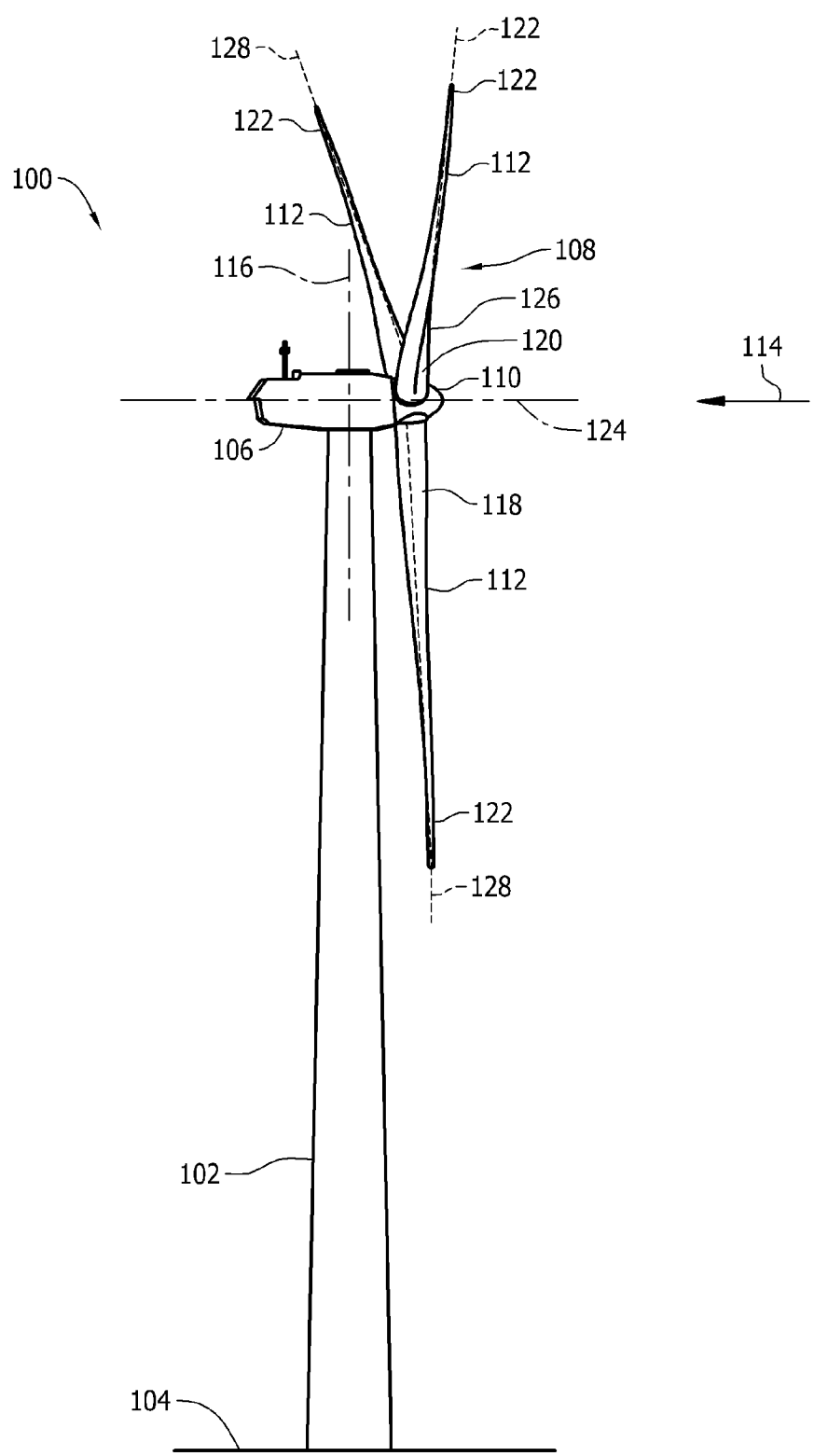
FIG. 1 is a schematic view of an exemplary wind turbine.

FIG. 1 is a schematic view of an exemplary wind turbine 100. In the exemplary embodiment, wind turbine 100 is a horizontal-axis wind turbine. Alternatively, wind turbine 100 may be a vertical-axis wind turbine. In the exemplary embodiment, wind turbine 100 includes a tower 102 extending from and coupled to a supporting surface 104. Tower 102 may be coupled to surface 104 with anchor bolts or via a foundation mounting piece (neither shown), for example. A nacelle 106 is coupled to tower 102, and a rotor 108 is coupled to nacelle 106. Rotor 108 includes a rotatable hub 110 and a plurality of rotor blades 112 coupled to hub 110. In the exemplary embodiment, rotor 108 includes three rotor blades 112. Alternatively, rotor 108 may have any suitable number of rotor blades 112 that enables wind turbine 100 to function as described herein. Tower 102 may have any suitable height and/or construction that enables wind turbine 100 to function as described herein.

Rotor blades 112 are spaced about hub 110 to facilitate rotating rotor 108, thereby transferring kinetic energy from wind 114 into usable mechanical energy, and subsequently, electrical energy. Rotor 108 and nacelle 106 are rotated about tower 102 on a yaw axis 116 to control a perspective of rotor blades 112 with respect to a direction of wind 114. Rotor blades 112 are mated to hub 110 by coupling a rotor blade root portion 118 to hub 110 at a plurality of load transfer regions 120. Load transfer regions 120 each have a hub load transfer region and a rotor blade load transfer region (both not shown in FIG. 1). Loads induced to rotor blades 112 are transferred to hub 110 via load transfer regions 120. Each rotor blade 112 also includes a rotor blade tip portion 122.

In the exemplary embodiment, rotor blades 112 have a length of between approximately 30 meters (m) (99 feet (ft)) and approximately 120 m (394 ft). Alternatively, rotor blades 112 may have any suitable length that enables wind turbine 100 to function as described herein. For example, rotor blades 112 may have a suitable length less than 30 m or greater than 120 m. As wind 114 contacts rotor blade 112, lift forces are induced to rotor blade 112 and rotation of rotor 108 about an axis of rotation 124 is induced as rotor blade tip portion 122 is accelerated.

A pitch angle (not shown) of rotor blades 112, i.e., an angle that determines the perspective of rotor blade 112 with respect to the direction of wind 114, may be changed by a pitch assembly (not shown in FIG. 1). More specifically, increasing a pitch angle of rotor blade 112 decreases an amount of rotor blade surface area 126 exposed to wind 114 and, conversely, decreasing a pitch angle of rotor blade 112 increases an amount of rotor blade surface area 126 exposed to wind 114. The pitch angles of rotor blades 112 are adjusted about a pitch axis 128 at each rotor blade 112. In the exemplary embodiment, the pitch angles of rotor blades 112 are controlled individually.

Figure 2:
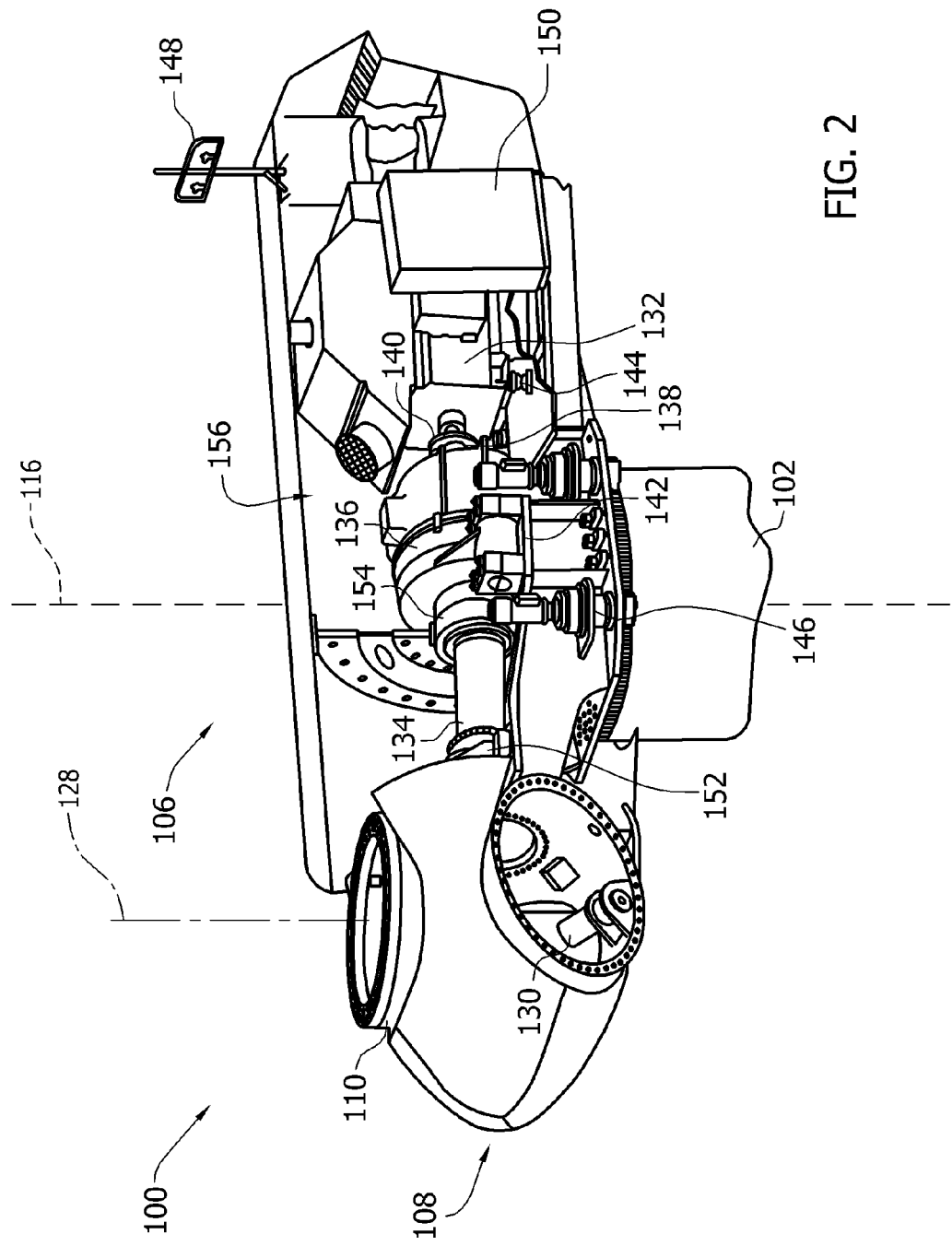
FIG. 2 is a partial sectional view of a nacelle that may be used with the wind turbine shown in FIG. 1.

FIG. 2 is a partial sectional view of nacelle 106 of exemplary wind turbine 100. Various components of wind turbine 100 are housed in nacelle 106. In the exemplary embodiment, nacelle 106 includes three pitch assemblies 130. Each pitch assembly 130 is coupled to an associated rotor blade 112 (shown in FIG. 1), and modulates a pitch of an associated rotor blade 112 about pitch axis 128. Only one of three pitch assemblies 130 is shown in FIG. 2. In one embodiment, each pitch assembly 130 includes at least one pitch drive motor (not shown).

As shown in FIG. 2, rotor 108 is rotatably coupled to an electric generator 132 positioned within nacelle 106 via a rotor shaft 134 (sometimes referred to as either a main shaft or a low speed shaft), a gearbox 136, a high speed shaft 138, and a coupling 140. Rotation of rotor shaft 134 rotatably drives gearbox 136 that subsequently drives high speed shaft 138, which in turn drives generator 132. High speed shaft 138 rotatably drives generator 132 via coupling 140 and rotation of high speed shaft 138 facilitates production of electrical power by generator 132. Gearbox 136 is supported by a support 142 and generator 132 is supported by a support 144. In the exemplary embodiment, gearbox 136 utilizes a dual path geometry to drive high speed shaft 138. Alternatively, rotor shaft 134 is coupled directly to generator 132 via coupling 140.

Nacelle 106 also includes a yaw drive mechanism 146 that rotates nacelle 106 and rotor 108 about yaw axis 116 to control the perspective of rotor blades 112 with respect to the direction of wind 114. Nacelle 106 also includes at least one meteorological mast 148 that includes a wind vane and anemometer (neither shown in FIG. 2). In one embodiment, meteorological mast 148 provides information, including wind direction and/or wind speed, to a turbine control system 150. Turbine control system 150 includes one or more controllers or other processors configured to execute control algorithms. As used herein, the term "processor" includes any programmable system including systems and microcontrollers, reduced instruction set circuits (RISC), application specific integrated circuits (ASIC), programmable logic circuits (PLC), and any other circuit capable of executing the functions described herein. The above examples are exemplary only, and thus are not intended to limit in any way the definition and/or meaning of the term processor. Moreover, turbine control system 150 may execute a SCADA (Supervisory, Control and Data Acquisition) program.

Pitch assembly 130 is operatively coupled to turbine control system 150. In the exemplary embodiment, nacelle 106 also includes forward support bearing 152 and aft support bearing 154. Forward support bearing 152 and aft support bearing 154 facilitate radial support and alignment of rotor shaft 134. Forward support bearing 152 is coupled to rotor shaft 134 near hub 110. Aft support bearing 154 is positioned on rotor shaft 134 near gearbox 136 and/or generator 132. Nacelle 106 may include any number of support bearings that enable wind turbine 100 to function as disclosed herein. Rotor shaft 134, generator 132, gearbox 136, high speed shaft 138, coupling 140, and any associated fastening, support, and/or securing device including, but not limited to, support 142, support 144, forward support bearing 152, and aft support bearing 154, are sometimes referred to as a drive train 156.

Figure 3:
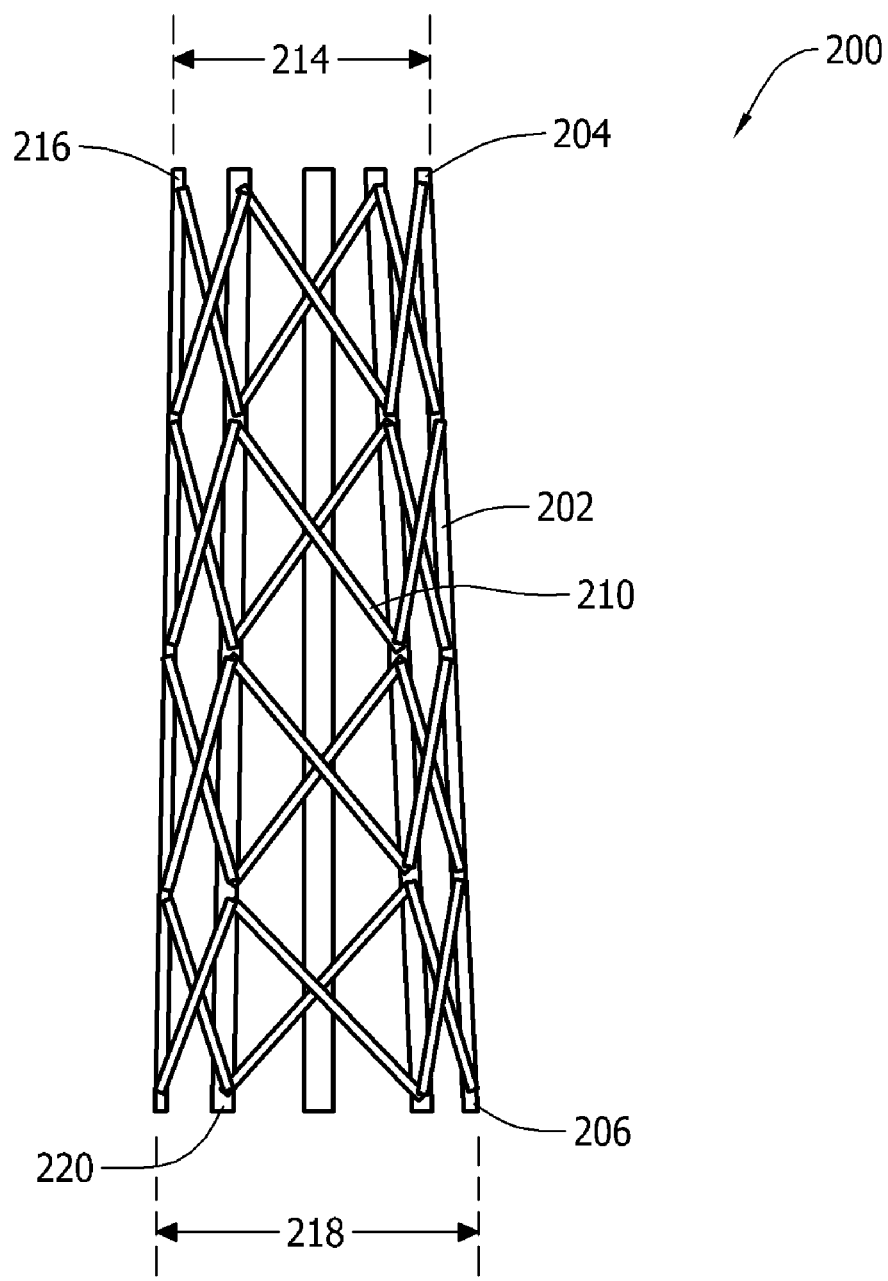
FIG. 3 is a perspective view of an exemplary lattice tower section that may be used with the wind turbine shown in FIG. 1.

FIG. 3 is a perspective view of an exemplary lattice tower section 200 that may be used with wind turbine 100. In the exemplary embodiment, lattice tower section 200 includes a plurality of leg members 202 that are oriented substantially vertically in the assembled configuration. More specifically, in the exemplary embodiment, lattice tower section 200 includes five leg members 202. Notably, however, lattice tower section 200 may include any suitable number of leg members 202 that enables tower section 200 to function as described herein. Each leg member 202 has a first end 204 and an opposite second end 206. A plurality of cross members 210 are coupled to and extend between leg members 202 to provide structural support to tower section 200. In the exemplary embodiment, cross members 210 are oriented in an "X" configuration between leg members 202. However, as appreciated by those skilled in the art, cross members 210 may be oriented in any orientation, such as forming a trapezoidal or hexagonal shape with leg members 202, that enables tower section 200 to function as described herein. In the exemplary embodiment, tower section 200 is tapered, such that a width 214 at an upper end 216 of tower section 200 is smaller than a width 218 at a lower end 220 of tower section 200. In the exemplary embodiment, leg members 202 are substantially straight. Alternatively, tower section is tapered due to a curvature of leg members 202. Further, in some embodiments, tower section 200 is not tapered.

Figure 4:
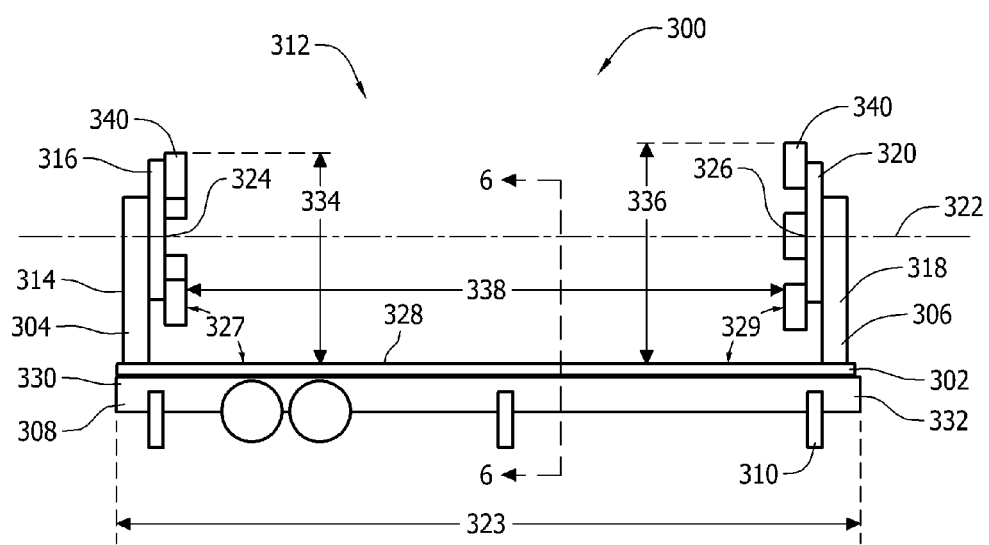
FIG. 4 is a schematic view of an exemplary system that may be used to assemble the lattice tower section shown in FIG. 3.
Figure 5:
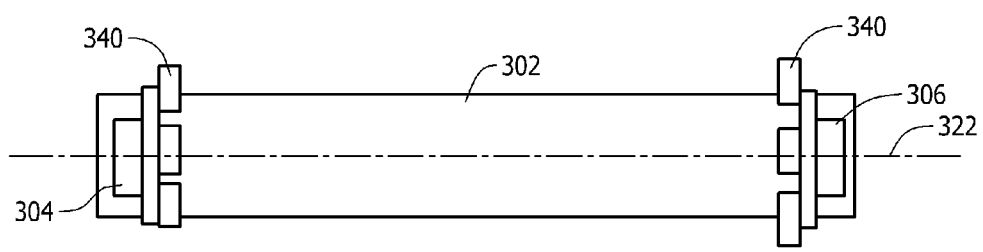
FIG. 5 is a plan view of the exemplary system shown in FIG. 4.
Figure 6:
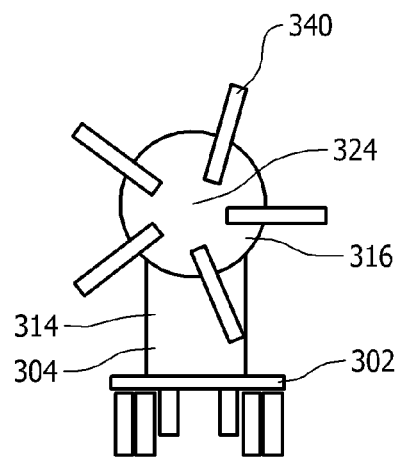
FIG. 6 is a cross-sectional view of the assembly system shown in FIG. 4 and taken along line 6-6.

FIG. 4 is a schematic view of an exemplary system 300 for use in assembling a section of a lattice tower, such as tower section 200. FIG. 5 is a plan view of system 300. FIG. 6 is a cross-sectional schematic view of system 300, taken along line 6-6. In the exemplary embodiment, system 300 includes an assembly platform 302, a first mounting assembly 304, and a second mounting assembly 306. Assembly platform 302 provides a support base for system 300, and first mounting assembly 304 and second mounting assembly 306 are each coupled thereto. In the exemplary embodiment, assembly platform 302 includes a flatbed trailer 308 that is capable of being transported by a vehicle (not shown), for example, a truck. Assembly platform 302 also includes a stabilizing system 310 that facilitates stabilizing assembly platform 302 and system 300 in a deployed position 312. In one embodiment, stabilizing system 310 may include, for example, hydraulic extenders.

First mounting assembly 304 includes a first fixture end 314 that is coupled to a first rotatable mount 316. Similarly, second mounting assembly 306 includes a second fixture end 318 that is coupled to a second rotatable mount 320. An axis of rotation 322 of assemblies 304 and 306 is defined along a longitudinal length 323 of system 300 through a center 324 of first rotatable mount 316 and a center 326 of second rotatable mount 320. A first angle, 327, is defined between first fixture end 314 and an upper surface 328 of assembly platform 302, and a second angle, 329, is defined between second fixture end 318 and upper surface 328 of assembly platform 302. First fixture end 314 and second fixture end 318 are coupled to opposite ends 330 and 332, respectively, of assembly platform 302 such that each fixture end 314 and 318 is selectively rotatable through angles 327 and 329, respectively, as described in detail below. First fixture end 314 has a height 334, and second fixture end 318 has a height 336.

In the exemplary embodiment, first fixture end 314 and second fixture end 318 are also each slidably coupled to assembly platform 302, such that first fixture end 314 and second fixture end 318 are selectively slidable towards each other and away from each other along assembly platform 302 in a direction that is substantially parallel to axis of rotation 322 such that a relative distance 338 defined between ends 314 and 318 may be decreased. For example, first fixture end 314 and second fixture end 318 may be slidably coupled within a track (not shown) defined in assembly platform 302. Alternatively, first fixture end 314 and second fixture end 318 may be mounted to rails, or any other suitable mechanism enabling first fixture end 314 and second fixture end 318 to function as described herein. In one embodiment, first fixture end 314 and second fixture end 318 may each include at least one slide locking mechanism (not shown) that facilitates securing a position of first fixture end 314 and second fixture end 318 relative to axis of rotation 322 and relative to each other.

In the exemplary embodiment, first rotatable mount 316 and second rotatable mount 320 are each rotatably connected to first fixture end 314 and second fixture end 318, respectively, such that each rotatable mount 316 and 320 is selectively rotatable about axis of rotation 322. In the exemplary embodiment, rotatable mounts 316 and 320 are rotatable simultaneously and moveable synchronously with respect to each other about axis of rotation 322. Moreover, first rotatable mount 316 and second rotatable mount 320 may be configured such that either mount 316 and/or 320 may be securely positioned in any rotational position or only in a discrete number of predefined rotational positions. Alternatively, rotatable mounts 316 and 320 may be rotatable independent of one another.

In one embodiment, the rotation of first rotatable mount 316 and second rotatable mount 320 is performed manually. Alternatively, any suitable system, such as pneumatic, electric, and/or hydraulic systems, may be used to control rotation of rotatable mounts 316 and 320. Moreover, in one embodiment, pneumatic, electric, and/or hydraulic systems may include a processor coupled to a control system for controlling the rotation of rotatable mounts 316 and 320.

In the exemplary embodiment, a plurality of arms 340 are coupled to first rotatable mount 316 and to second rotatable mount 320. More specifically, in the exemplary embodiment, five arms 340 are coupled to first rotatable mount 316 and to second rotatable mount 320. Alternatively, any suitable number of arms 340 may be coupled to first rotatable mount 316 and/or to second rotatable mount 320 that enables system 300 to function as described herein.

In the exemplary embodiment, each arm 340 is sildably coupled to either first rotatable mount 316 or second rotatable mount 320, such that arm 340 is selectively moveable in a radial direction with respect to axis of rotation 322. Moreover, because arms 340 can be radially adjusted relative to mounts 316 or 320, tower sections 200 with different dimensions can be accommodated, as described in detail below. In one embodiment, a radial position of each arm 340 may be secured using at least one arm lock mechanism (not shown). Each arm 340 is configured to removably couple to a first end 204 and a second end 206 of at least one of leg members 202 of lattice tower section 200 being assembled. For example, each arm 340 may include a coupling mechanism, such as, but not limited to, hydraulic jaws and/or electric jaws. Alternatively, each arm 340 may be formed with pre-defined apertures (not shown) that enable a fastener, such as a bolt assembly, to be inserted therethrough to couple a portion of a lattice tower section 200 to arm 340 which is in turn coupled to mounts 316 and/or 320.

Figure 7:
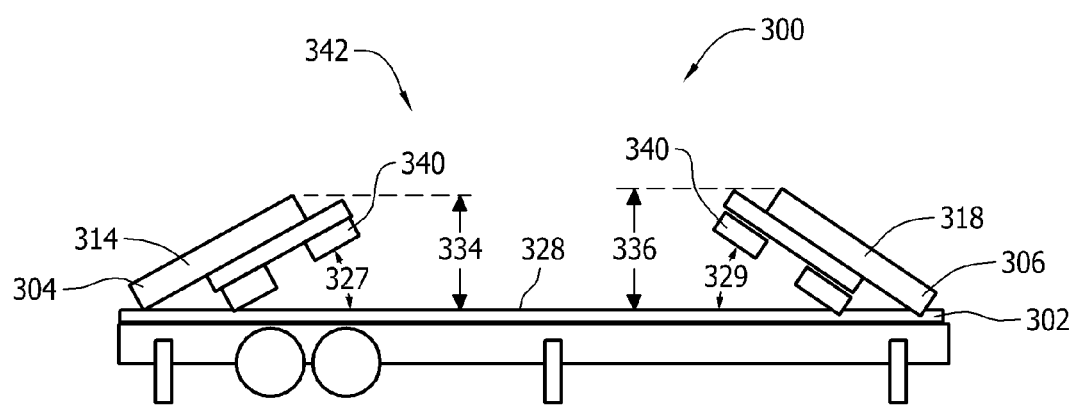
FIG. 7 is a schematic view of the assembly shown in FIG. 4 in a stored position.

FIG. 7 is a schematic view of assembly system 300 in a collapsed position or stored position 342. When assembly system 300 is not in use, for example, when system 300 is being transported, system 300 may be selectively positioned in stored position 342. As described above, first fixture end 314 and second fixture end 318 are coupled to opposite ends 330 and 332, respectively, of assembly platform 302 such that each fixture end 314 and 318 is selectively rotatable through angles 327 and 329. More specifically, fixture ends 314 and 318 are selectively rotatable from fully deployed position 312, in which first fixture end 314 and second fixture end 318 are oriented substantially vertically (shown in FIG. 3), to stored position 342. In one embodiment, first fixture end 314 and/or second fixture end 318 may each include at least one locking mechanism (not shown) that enables first fixture end and/or second fixture end to be secured in deployed position 312 and/or stored position 342.

In stored position 342, arms 340 are retracted radially inwardly to facilitate decreasing the overall physical height of assembly system 300, as angle 327 defined between first fixture end 314 and upper surface 328 of assembly platform 302 and angle 329 defined between surface 328 and second fixture end 318 are decreased. Moreover, as ends 314 and 318 are rotated and folded towards assembly platform 302, relative height, 334 and 336, respectively, of first mounting assembly 304 and second mounting assembly 306 is decreased as compared to height, 334 and 336, of each assembly 304 and 306 in deployed position 312. First fixture end 314 and second fixture end 318 may also be slid along assembly platform 302 such that with arms 340 retracted, first fixture end 314 and second fixture end 318 may be selectively moved relative to assembly platform 302 such that a relative distance 338 (shown in FIG. 4) defined between ends 314 and 318 may be decreased (not shown).

Figure 8:
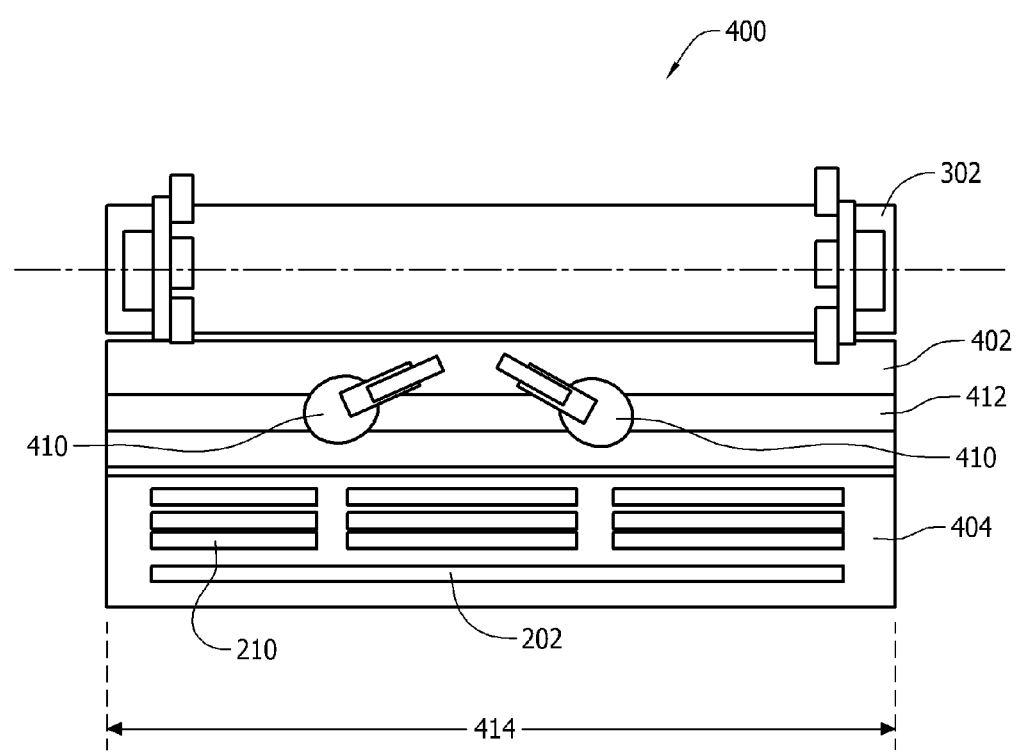
FIG. 8 is a schematic plan view of an exemplary lattice tower field deployment system that may be used with the assembly system shown in FIG. 4.

FIG. 8 is a schematic plan view of an exemplary lattice tower deployment system 400 that may be used to assemble a lattice tower section 200. In the exemplary embodiment, deployment system 400 includes assembly platform 302, a support platform 402 and a materials platform 404. Similar to assembly platform 302, support platform 402 and materials platform 404 may include a flatbed trailer (not shown) that enables transportation by a vehicle (not shown). Moreover, support platform 402 and materials platform 404 may include a stabilizing system 310. Alternatively, assembly platform 302, supporting platform 402, and materials platform 404 may all be included on a single flatbed trailer.

In the exemplary embodiment, materials platform 404 includes at least some of the materials needed to assemble lattice tower section 200, such as, but not limited to only, leg members 202 and cross members 210. For example, materials platform 404 may also contain other components used in the assembly of lattice tower section 200 and/or system 300.

In the exemplary embodiment, support platform 402 includes a pair of material handling devices 410. Alternatively, support platform 402 includes any suitable number of material handling devices 410 that enable support platform 402 to function as described herein. More specifically, in the exemplary embodiment, each material handling device 410 is a weight compensating apparatus that is configured to selectively lift and/or position leg members 202, cross members 210, and/or any other materials transported on materials platform 404 and/or use during assembly of lattice tower section 200. Accordingly, in the exemplary embodiment, each material handling device 410 is configured to removably grasp and/or couple to leg members 202, cross members 210, and/or other materials on platform 404. In one embodiment, material handling devices 410 include end effectors (not shown) which enable material handling devices 410 to drill and/or tap holes as well as insert and/or tighten bolts and/or other fastening devices to couple leg members 202 and/or cross members 210 to one another.

In one embodiment, each material handling device 410 is a robotic apparatus that is controlled by a suitable computer system. As such, in some embodiments, material handling device 410 may be at least partially automated, such that the robotic apparatus is configured to assist in the assembly of at least a portion of lattice tower section 200 automatically. In the exemplary embodiment, each material handling device 410 is coupled to a track 412, and each device 410 is selectively moveable and repositionable along a length 414 of track 412.

Figure 9:
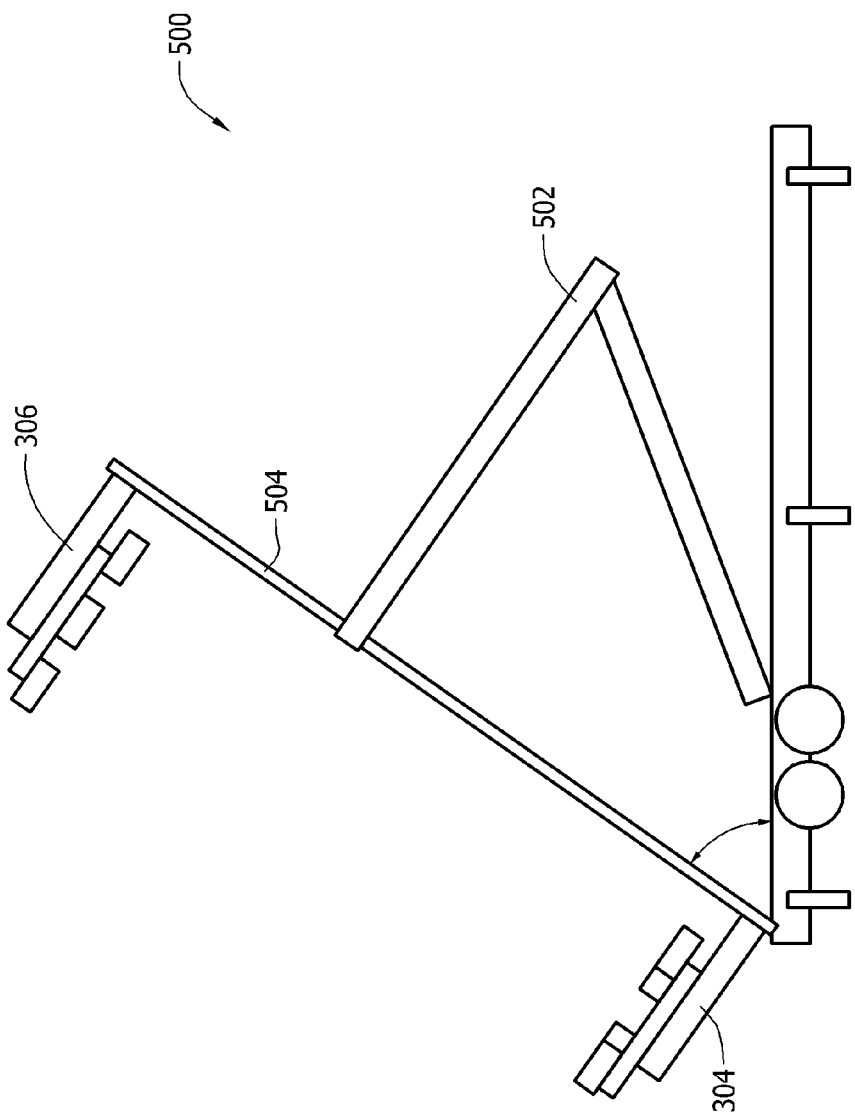
FIG. 9 is a schematic view of an exemplary lift system that may be used with the assembly system shown in FIG. 4.

FIG. 9 is a schematic view of a lift system 500 that may be used in assembling a lattice tower section 200. In the exemplary embodiment, lift system 500 includes a hydraulic lift assembly 502 and a lift platform 504. In the exemplary embodiment, first mounting assembly 304 and second mounting assembly 306 are each coupled to lift platform 504, and hydraulic lift assembly 502 is configured to selectively elevate lift platform 504 from a substantially horizontal position to a substantially vertical position. More specifically, using hydraulic lift assembly 502, after a lattice tower section 200 is at least partially assembled on its side, lift platform 504 can be selectively rotated and/or elevated to enable that lattice tower section 200 be oriented in a substantially vertical position. With assembled lattice tower section 200 oriented vertically, a crane or other device can be used to move lattice tower section 200 away from system 300 and/or to position lattice tower section 200 relative to a tower 102 being constructed. In one embodiment, to facilitate removal of assembled lattice tower section 200, whether in the horizontal or vertical position, mounting assemblies 304 and/or 306 are capable of rotating and/or sliding away from assembled lattice tower section 200.

Figure 10:
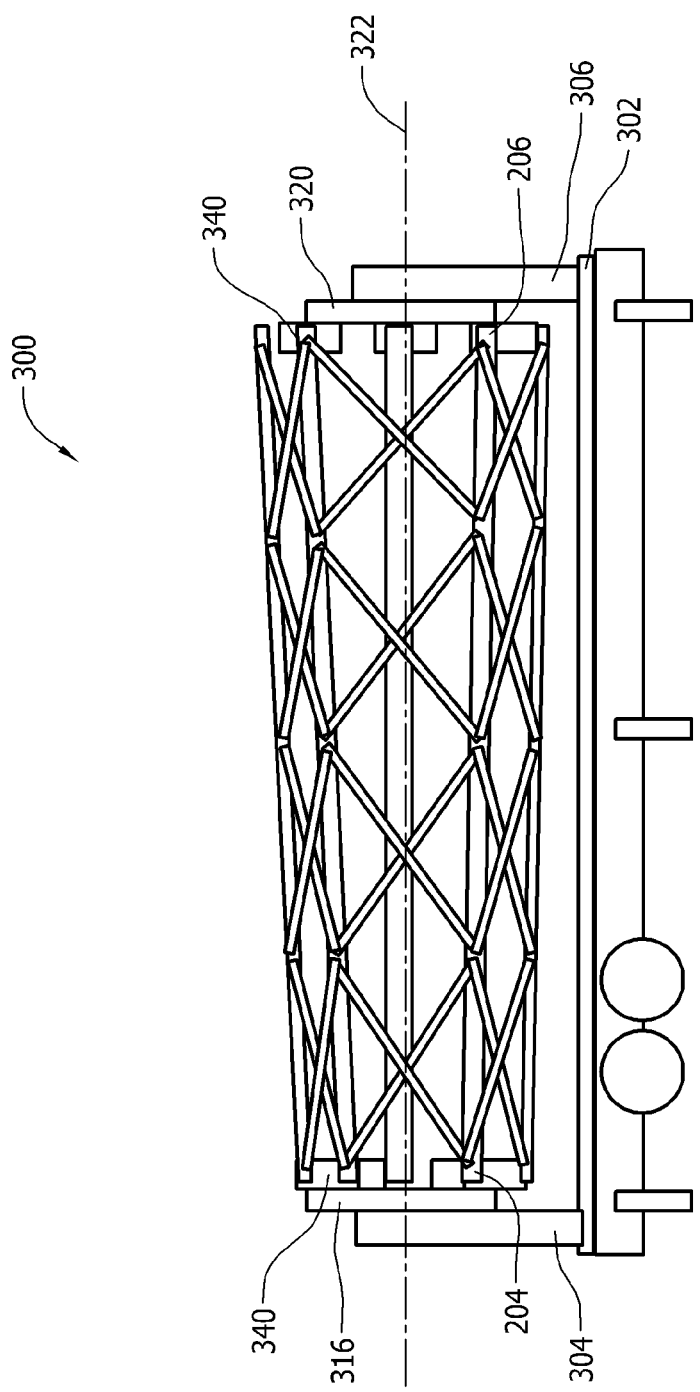
FIG. 10 is a schematic view of the assembly system shown in FIG. 4 having a lattice tower section mounted thereon.

FIG. 10 is a schematic view of system 300 with lattice tower section 200 coupled thereon. In the exemplary embodiment, during assembly of lattice tower section 200, each leg member 202 is eventually secured at a first end 204 to an arm 340 on first mounting assembly 304, and secured at a second end 206 to an arm 340 on second mounting assembly 306. As described above, ends 204 and 206 may be secured to arms 340 using a variety of coupling devices, including fastener mechanisms, clamps, hydraulic jaws, and/or electric jaws. During assembly of tower section 200, leg members 202 may be positioned between first mounting assembly 304 and second mounting assembly 306 using a crane or other suitable device. Alternatively, in one embodiment, at least one material handling device 410 may be used to position leg member 202 between first mounting assembly 304 and second mounting assembly 306.

Because each of arms 340 can be selectively radially adjusted, tower sections 200 of various widths can be assembled using system 300. Moreover, because first mounting assembly 304 and/or second mounting assembly 306 is selectively moveable along axis of rotation 322, leg members 202 of various lengths can be coupled between assemblies 304 and 306. As such, tower sections 200 of various heights and widths can be assembled using assembly system 300. In the exemplary embodiment, because tower section 200 is tapered, arms 340 on first mounting assembly 304 may be adjusted to be at different radial positions than arms 340 on second mounting assembly 306.

During assembly, rotatable mounts 316 and 320 may be selectively rotated after each leg member 202 is coupled thereto. Because rotatable mounts 316 and 320 are rotatable simultaneously, each leg member 202 may be selectively secured within assembly system 300 at the same relative rotational position. Alternatively, at least one rotatable mount 316 and 320 may be secured at a selected rotational position until all leg members 202 are coupled between rotatable mounts 316 and 320.

The tower section assembly process is repeated until at least two leg members 202 are secured to first mounting assembly 304 at first end 204, and to second mounting assembly 306 at second end 206. Those leg members 202 are selectively rotated about axis of rotation 322 to an "accessible position" which enables cross members 210 to be coupled between adjacent leg members 202.

Other hardware may also be installed lattice tower section 200 is coupled within system 300. For example, ladders, tower platforms, and/or electrical conduits used with the assembled tower 102 could be coupled within tower section 200. Because lattice tower section 200 is in a substantially horizontal position when coupled to system 300, it may be more efficient to install hardware while lattice tower section 200 remains mounted to system 300, rather than when tower section 200 is oriented vertically.

Installing cross members 210 and other hardware may be performed manually by personnel, or such a process may be at least partially automated. In the embodiment wherein at least one material handling device 410 is a robotic apparatus, material handling device 410 may be programmed to automatically install cross members 210 and other hardware. For example, in one embodiment, system 300 is used to wrap a fabric covering around tower section 200. Specifically, as assembled tower section 200 remains mounted between first mounting assembly 304 and second mounting assembly 306, fabric covering can be attached to tower section 200 as tower section 200 rotated.

To perform such functions, in one embodiment, material handling device 410 may utilize computer-based vision software. Alternatively, material handling device may utilize any programming and/or processor that enables system 300 to function as described herein. The above-described procedures may be completed in any order. For example all leg members 202 could be secured between mounting assemblies 304 and 306 before any cross members 210 are installed. Alternatively, cross members 210 can be coupled between adjacent leg members 202 before additional leg members 202 are mounted to system 300.

As compared to known tower assembly systems, the system described herein facilitate rapid construction of a lattice tower section, because the system is able to secure leg members and rotate the leg members so that cross members can be coupled to the leg members. Further, as compared to known tower systems, the system described herein enables hardware, such as ladders, tower platforms, and/or electrical conduits, to be installed in the tower section while the tower section is mounted in a substantially horizontal position. Moreover, the system described herein enables an assembled tower section to be moved from a substantially horizontal to a substantially vertical position because a lift assembly can move the assembly platform from a substantially horizontal position to a substantially vertical position while the tower section is mounted on the assembly platform. Further, the system described herein is mobile because the various components can be part of a trailer transportable by a vehicle and the system can be moved from a deployed position to a stored position.

Moreover, section panels are generally more inexpensive and simpler to manufacture than unitary tower sections. Further, the connectors described herein improve facilitating the alignment of section panels during assembly because the spacer elements and slots secure the position of the section panels during assembly. Moreover, as compared to unitary flanges, the section connectors described herein facilitate reducing hoop stresses induced to the tower sections because the section connectors are flexible with respect to one another.

The systems and methods described herein facilitate the assembly of a tower section. Specifically, utilizing the systems and methods described herein facilitates a relatively quick and efficient assembly of a lattice tower section in the field. Further, the systems and methods described herein aid in manipulating and assembling components of a lattice tower section, which are generally heavy and unwieldy. Moreover, the systems and methods described herein are capable of assembling lattice tower sections of various diameters and heights.

Exemplary embodiments of systems and methods for assembling a tower section are described above in detail. The systems and methods described herein are not limited to the specific embodiments described herein, but rather, components of the systems and/or steps of the methods may be utilized independently and separately from other components and/or steps described herein. For example, the methods and systems described herein may have other applications not limited to practice with wind turbines, as described herein. Rather, the methods and systems described herein can be implemented and utilized in connection with various other industries.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An assembly system for use in assembling a lattice tower section, said system comprising:
    a platform;
    a first mounting assembly coupled to said platform; and,
    a second mounting assembly coupled to said platform, said first and second mounting assemblies are configured to secure opposite ends of a plurality of leg members used in assembling the lattice tower section such that each of the plurality of leg members is suspended a distance from said platform, at least one of said first and second mounting assemblies is configured to selectively rotate a leg member of the plurality of leg members suspended therefrom, wherein said first mounting assembly and said second mounting assembly each comprise:
    a fixture end;
    a rotatable mount coupled to said fixture end; and,
    a plurality of arms coupled to said rotatable mount.

2. A system in accordance with claim 1, further comprising a hydraulic lift configured to selectively reposition said platform between a substantially horizontal position and a substantially vertical position.

3. A system in accordance with claim 1, wherein each said fixture end is pivotally coupled to said platform and is selectively movable between a deployed position and a stored position.

4. A system in accordance with claim 1, wherein each said fixture end is slidably coupled to said platform, such that said first and second fixture ends are selectively movable towards and away from one another.

5. A system in accordance with claim 1, wherein each of said plurality of arms is selectively movable in a radial direction with respect to said rotatable mount.

6. A system in accordance with claim 1, wherein each of said plurality of arms is configured to couple to an end of one of the plurality of leg members.

7. A system in accordance with claim 1, wherein said platform comprises a trailer configured to be transported by a vehicle.

8. A system in accordance with claim 1, wherein said assembly system is selectively movable between a deployed position and a stored position.

9. A lattice tower deployment system comprising:
    an assembly system comprising:
      a platform;
      a first mounting assembly coupled to said platform; and,
      a second mounting assembly coupled to said platform, said first and second mounting assemblies are configured to secure opposite ends of a plurality of leg members used in assembling a lattice tower section, said first and second mounting assemblies are configured to selectively rotate at least one of the plurality of leg members suspended therebetween, wherein said first mounting assembly and said second mounting assembly each comprise:
      a fixture end;
      a rotatable mount coupled to said fixture end; and,
      a plurality of arms coupled to said rotatable mount, each of said plurality of arms configured to couple to at least one of the plurality of leg members; and, a support system configured to selectively position the plurality of leg members relative to said assembly system.

10. A system in accordance with claim 9 wherein said support system comprises a robotic apparatus.

11. A system in accordance with claim 9, wherein at least one of said assembly system and said support system comprises a trailer configured to be transported by a vehicle.

12. A system in accordance with claim 9, wherein said assembly system is selectively movable between a deployed position and a stored position.

13. A method of assembling a lattice tower section comprising:
  providing an assembly system including a platform, a first mounting assembly coupled to the platform, and a second mounting assembly coupled to the platform;
  coupling a first end of a first leg member to the first mounting assembly and a second end of the first leg member to the second mounting assembly such that the first leg member is suspended a distance from the platform;
  coupling a first end of a second leg member to the first mounting assembly and a second end of the second leg member to the second mounting assembly such that the second leg member is suspended a distance from the platform;
  rotating selectively the first and second leg members utilizing the assembly system; and,
  coupling at least one cross member between the first and second leg members such that the cross member extends from the first leg member to the second leg member.

14. A method in accordance with claim 13, further comprising repositioning the platform between a substantially horizontal position and a substantially vertical position using a lift assembly.

15. A method in accordance with claim 13, further comprising moving at least one of the first and second mounting assemblies towards the other mounting assembly to enable each of the plurality of leg members to be suspended by the mounting assemblies a distance above the platform.

16. A method in accordance with claim 13, further comprising moving selectively at least one arm coupled to at least one of the first and second mounting assemblies.

17. A method in accordance with claim 16, wherein coupling a first end of a first leg member to the first mounting assembly and a second end of the first leg member to the second mounting assembly further comprises coupling the leg member to the at least one arm.

18. A method in accordance with claim 13, further comprising selectively moving at least one of the first mounting assembly and the second mounting assembly between a deployed position and a stored position.

* * * * *